(12) United States Patent
Kakimoto

(10) Patent No.: US 7,577,734 B2
(45) Date of Patent: Aug. 18, 2009

(54) LOAD TEXT EXECUTION APPARATUS, LOAD TEST EXECUTION SYSTEM, METHOD THEREOF AND PROGRAM THEREOF

(75) Inventor: Atsushi Kakimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1052 days.

(21) Appl. No.: 10/207,217

(22) Filed: Jul. 30, 2002

(65) Prior Publication Data
US 2003/0028828 A1    Feb. 6, 2003

(30) Foreign Application Priority Data
Jul. 30, 2001    (JP) ............... 2001-229012

(51) Int. Cl.
*G06F 15/173* (2006.01)
(52) U.S. Cl. .................................... 709/224
(58) Field of Classification Search ............... 709/224; 718/105; 703/21
See application file for complete search history.

(56) References Cited

U.S. PATENT DOCUMENTS

| | | | | |
|---|---|---|---|---|
| 5,793,763 A | * | 8/1998 | Mayes et al. ............... 370/389 |
| 5,812,780 A | * | 9/1998 | Chen et al. .................. 709/224 |
| 6,055,574 A | * | 4/2000 | Smorodinsky et al. ....... 709/226 |
| 6,590,861 B1 | * | 7/2003 | Vepa et al. .................. 370/216 |
| 6,687,748 B1 | * | 2/2004 | Zhang et al. ................ 709/223 |
| 6,944,785 B2 | * | 9/2005 | Gadir et al. .................... 714/4 |
| 2002/0026503 A1 | * | 2/2002 | Bendinelli et al. .......... 709/220 |
| 2003/0149765 A1 | * | 8/2003 | Hubbard et al. ............. 709/224 |

OTHER PUBLICATIONS

Egevang K. et al., The IP Network Address Translator (NAT), May 1994, Network Group, Request For Comments: 1631, pp. 1-10.*

* cited by examiner

*Primary Examiner*—Andrew Caldwell
*Assistant Examiner*—Benjamin Ailes
(74) *Attorney, Agent, or Firm*—Fitzpatrick, Cella, Harper & Scinto

(57) ABSTRACT

A plurality of virtual client processes for accessing a server are simultaneously operated on test execution terminal, when accessing the server by each virtual client process, respectively unique virtual network addresses are set, a source network address in a transmission packet is rewritten into the set virtual network address from an actual network address, a destination network address in a reception packet from the server is rewritten into the actual network address from the virtual network address, and this packet is transferred to the client with this virtual network address set therein. Load tests of accesses to the server from a multiplicity of client terminals can be executed by a small number of test terminals without depending on network protocols.

10 Claims, 12 Drawing Sheets

FIG. 4

| MANAGEMENT INFORMATION | DATA IDENTIFICATION INFORMATION | | | 401 |
|---|---|---|---|---|
| | NUMBER OF VIRTUAL CLIENTS | | | 402 |
| | OPERATION FLAG | | | 403 |
| SETTING INFORMATION OF VIRTUAL CLIENT [1] | PROTOCOL INFORMATION OF CONVERSION OBJECT | | | 404 |
| | VIRTUAL NETWORK ADDRESS INFORMATION | | | 405 |
| | NUMBER OF CONVERSION SETTING INFORMATION | | | 406 |
| | CONVERSION SETTING INFORMATION [1] | LOGICAL NETWORK INFORMATION | LOCAL PORT | 407 |
| | | | REMOTE ADDRESS | 408 |
| | | | REMOTE PORT | 409 |
| | | PHYSICAL NETWORK INFORMATION | LOCAL PORT | 410 |
| | | | REMOTE ADDRESS | 411 |
| | | | REMOTE PORT | 412 |
| | ... | | | |
| | CONVERSION SETTING INFORMATION [n] | ... | | 413 |
| ... | | | | |
| SETTING INFORMATION OF VIRTUAL CLIENT [N] | ... | | | |

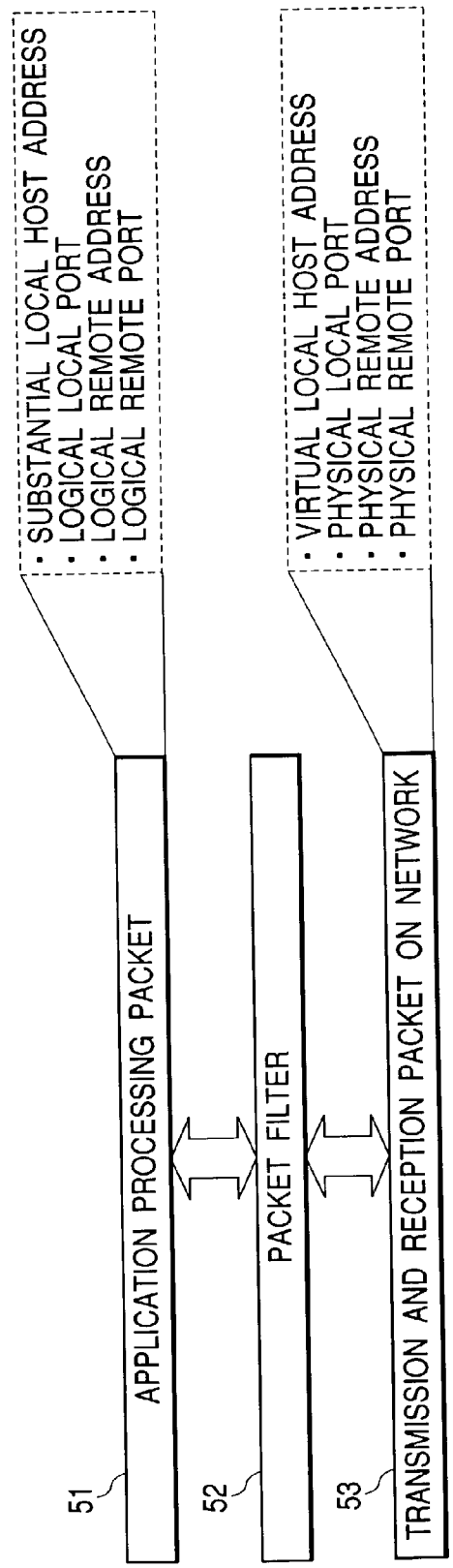

FIG. 9

```
127.0.0.1              localhost
172.20.103.50          TestSrv                        ─91
172.20.103.60          Client0
172.20.103.61          Client1
```

```
127.0.0.1              localhost
172.20.103.50          TestSrv
172.20.103.60          Client0
172.20.103.61          Client1
#Below are Virtual Address
172.20.104.10          Client0-VC0                    ─92
172.20.104.11          Client0-VC1
172.20.104.12          Client0-VC2
172.20.104.13          Client0-VC3
172.20.105.10          Client1-VC0
172.20.105.11          Client1-VC1
172.20.106.10          TestSrv-VC0
172.20.106.11          TestSrv-VC1
172.20.106.12          TestSrv-VC2
172.20.106.13          TestSrv-VC3
#End of Virtual Address
```

FIG. 11

| MANAGEMENT INFORMATION | DATA IDENTIFICATION INFORMATION | | 1101 |
|---|---|---|---|
| | TEST MANAGER TERMINAL INFORMATION | | 1102 |
| | TEST EXECUTION TERMINAL NUMBER | | 1103 |
| SETTING INFORMATION OF TEST TERMINAL [1] | TEST EXECUTION TERMINAL INFORMATION | | 1104 |
| | NUMBER OF LOAD PROCESSING TO BE GENERATED | | 1105 |
| | SIMULTANEOUS EXECUTION INFORMATION OF PROCESSING | | 1106 |
| | TIMEOUT INFORMATION | | 1107 |
| | SETTING OF LOAD PROCESSING [1] | CLIENT MODULE NAME | 1108 |
| | | TEST DATA FILE NAME | 1109 |
| | | CLIENT MODULE OPERATION SETTING INFORMATION | 1110 |
| | | VIRTUAL NETWORK ADDRESS INFORMATION | 1111 |
| | | LOAD OBJECT SERVER INFORMATION | 1112 |
| | | OTHER CONTROL INFORMATION | 1113 |
| | ... | | |
| | SETTING OF LOAD PROCESSING [N] | ... | |
| ... | | | |
| SETTING INFORMATION OF TEST TERMINAL [n] | ... | | |

LOAD TEXT EXECUTION APPARATUS, LOAD TEST EXECUTION SYSTEM, METHOD THEREOF AND PROGRAM THEREOF

BACKGROUND OF THE INVENTION

1. Field of the Invention

The present invention relates to a variety of network server systems existing on networks, and to a load test execution apparatus and a system thereof that are capable of executing a performance test for a load of accesses from client terminals.

2. Related Background Art

With developments of the network technologies over the recent years, there increase applications actualized in the form of server/client systems on the networks. A test for this type of application, unlike the conventional standalone type application, requires a inspection of the whole system including the network in order to measure a performance thereof and detect a bottleneck thereof, and is therefore very hard to perform.

For the purpose described above, a conventional system for testing the load on the network server involves preparing actually a plurality of client terminals, setting individual network addresses to the respective client terminals, then executing a client application and generating a load by actually accessing the server.

Further, in some of the load test tools, a plurality of client processes are generated on one single terminal, and accesses to the server are thus generated. Each client process, however, executes accessing the server by use of the same network address in all cases, and is therefore incapable of simulating the accesses with a fidelity from the plurality of client terminals each having an actual unique network address.

Moreover, if a multihoming function incorporated into operating systems such as UNIX, Windows and so on is utilized, a plurality of addresses can be given on one single terminal. There is also a load test system capable of having a test object server accessed in a way that provide a unique address for every client module by utilizing this multihoming function.

On the other hand, as for an access pattern, the conventional system for testing the load on the network server has hitherto used a method of previously recording a server/client access pattern, and thereafter retransmitting the access pattern from the respective rest execution terminals at one time, or a method of configuring a special test system specialized for a test object server.

Such being the case, an OS-level connection process can not be utilized depending on a network protocol on which each client module is based, and hence there was a case of being unable to utilize the multihoming function.

Further, on the occasion of setting the virtual address described above, there is a necessity of resetting the virtual address each time the test is executed, and hence there often occurs a case in which the network setting of the test terminal itself becomes troublesome.

On the other hand, as to the access pattern, the access pattern batchwise retransmission method described above is effective in a network server such as a Web server that sends a simple response back and is ineffective in a server such as an application server that sends a variety of responses back depending on server statuses, wherein the client must execute a process corresponding to each response.

Moreover, the above-described method of configuring the special test system specialized for the test object server is effective in a load test with respect to a specified server system, however, the test system needs configuring in the case of performing the load test on a different server system.

SUMMARY OF THE INVENTION

Accordingly, it is a primary object of the present invention to provide a load test execution apparatus capable of having a test object server accessed in a way that gives a unique address for every client module on one single apparatus without changing a connection process to the server with respect to the client modules utilizing various categories of network protocols.

It is another object of the present invention to provide a load test execution apparatus capable of executing a performance test for a load of accesses from a multiplicity of client terminals to a network server by use of a small number of test execution terminals without depending on the network protocol utilized.

According to one aspect, the present invention which achieves these objectives relates to a load test execution apparatus for testing a load of accesses from clients to a server on a network, comprising client process managing means for simultaneously operating a plurality of client processes for accessing the server, virtual network address setting means for setting respectively-unique virtual network addresses of the plurality of client processes, transmission packet rewriting means for checking generated pieces of information contained in a network packet when accessing the server by each of the client processes, and rewriting source network address information contained in this packet into a virtual network address set in the client process by the virtual network address setting means from an actual network address possessed by the apparatus, and reception packet rewriting means for checking destination network address information contained in the network packet received from the server, rewriting the destination network address information contained in the packet into the actual network address of the apparatus, and transferring this packet to the client process with the concerned virtual network address set therein.

According to another aspect the present invention which achieves these objectives relates to a load test execution method in a load test execution apparatus for testing a load of accesses from clients to a server on a network, comprising a client process managing step of simultaneously operating a plurality of client processes for accessing the server on the load test execution apparatus, a virtual network address setting step of setting respectively-unique virtual network addresses of the plurality of client processes, a transmission packet rewriting step of checking generated pieces of information contained in a network packet when accessing the server by each of the client processes, and rewriting source network address information contained in this packet into a virtual network address set in the client process in the virtual network address setting step from an actual network address possessed by the apparatus, and a reception packet rewriting step of checking destination network address information contained in the network packet received from the server, rewriting the destination network address information contained in the packet into the actual network address of the apparatus, and transferring this packet to the client process with the concerned virtual network address set therein.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a diagram showing an example of structure of packet filtering setting information;

FIG. 5 is a diagram showing one example of a relationship between application processing packet and a transmission/reception packet on a network;

FIG. 9 is a diagram showing one example of original network setting information and network setting information for testing;

FIG. 11 is a diagram showing an example of a data structure of test operation information.

DETAILED DESCRIPTION OF THE PREFERRED EMBODIMENTS

One preferred embodiment of the present invention will hereinafter be described in depth with reference to the accompanying drawings.

First Embodiment

One embodiment of a load testing system for executing a load test on a network server according to the present invention, will hereinafter be discussed. The following discussion, however, embraces explanations of one embodiments of a test manager terminal, a test execution terminal and a recording medium recorded with application software for actualizing functions of these terminals.

Figure 1:
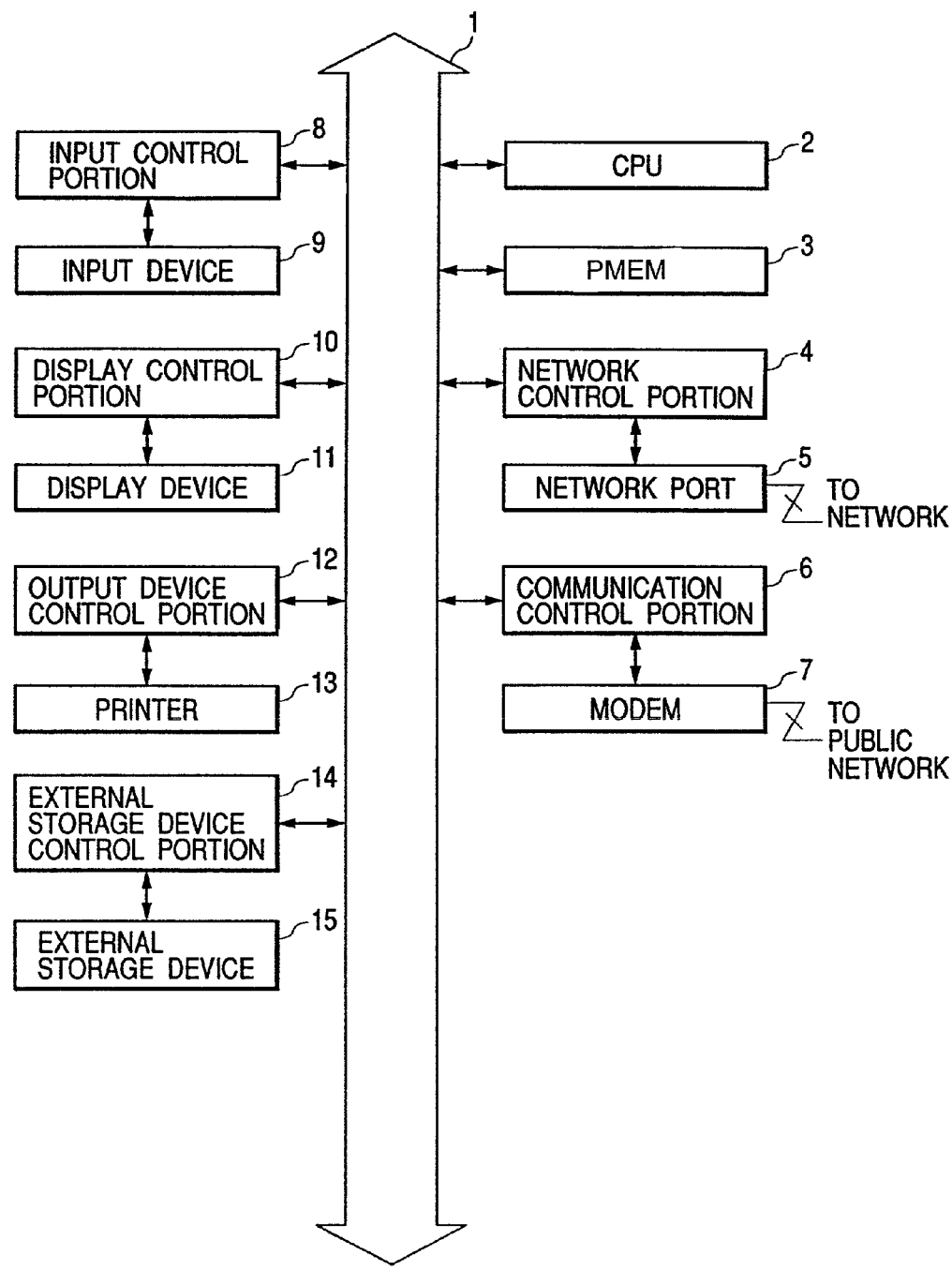
FIG. 1 is a system block diagram of a test manager terminal and a test execution terminal in one embodiment of the present invention.

FIG. 1 is a system block diagram showing the test manager terminal and the test execution terminal in the first embodiment.

A CPU (Central Processing Unit) 2 controls respective terminal portions and executes programs. The programs executed by the CPU 2 are properly selected and read from an external storage device 18 and are stored in a program memory (which is abbreviated to PMEM) 3. The PMEM 3 is defined as a text memory into which data inputted from an input device 10 are stored as code information.

A network control portion 4 controls I/O data to and from a network port 5. Signals outputted from the network port 5 are transmitted via a network to network ports of other devices on the network. The data are transferred to and received from other terminals on the network through this network control portion 4.

A communication control portion 6 controls a modem 7 etc connected when performing communications by utilizing a public network. Namely, the present load testing system can also target a load test for a network connection utilizing the public network other than LAN.

An input control portion 8 controls an input device 9 connected thereto. The input device 9 is, for example, a keyboard, a mouse and so on. An operator operates this input device 9, thereby giving operation commands of the system.

A display device 11 is connected to a display control portion 10, and a result of input instruction through the input device 9, test setting information and information on a test execution result are displayed on this display device 11.

An output device control portion 12 performs data output control to a printer 13 connected thereto.

An external storage device control portion 14 controls an external storage device 15 connected thereto. A program for controlling a function of this device, image data etc are retained on this external storage device 15.

Figure 2:
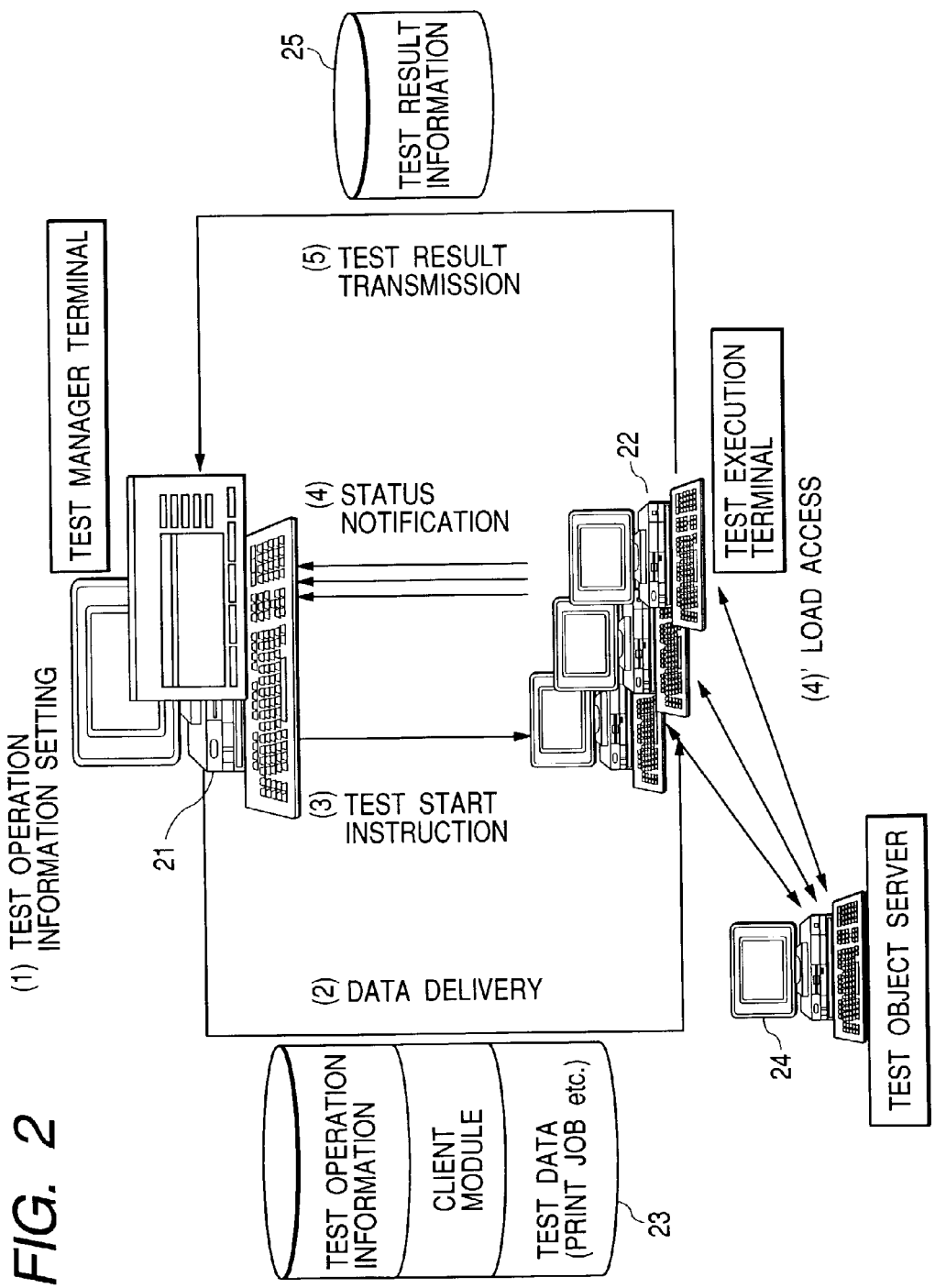
FIG. 2 is a view showing data exchange steps in a load test system in this embodiment.

FIG. 2 is a view showing procedures of a data exchange in the load testing system according to the first embodiment. The following shows a description of how the data are transferred and received between the test manager terminal and each test execution terminal that configure the load testing system in the first embodiment. The following also shows procedures of a process of how a load of access to a test object service device on the network is made to occur.

(1) Setting of Test Operation Information:

The test manager terminal 21 on the network selects a test execution terminal 22 for executing a test from a test execution terminal list displayed on a screen of this test manager terminal 21, then specifies a client module running on the selected execution terminal, and indicates test data 23 such as a print job etc used by the client module.

(2) Data Distribution:

Only a necessary item of data among pieces of data 23 set in the test operation information setting (1) is transmitted to each test execution terminal 22 by utilizing a distribution mechanism of the test manager terminal 21.

(3) Test Start Instruction:

Each test execution terminal 22 executes, based on a command of the test start instruction given from the test manager terminal 21, an initializing process of the client module distributed.

(4) Load Access:

Each test execution terminal 22 boots the client module in accordance with the test operation information instructed, and generates a load access onto the test object server 24 by using the test data 23 distributed. Further, at this time, each test execution terminal 22 notifies the test manager terminal 21 of an operation status of the individual client module as status information.

(5) Transmission of Result of Test:

Upon finishing the process of the load access described in the above item (4), each test execution terminal 22 uploads pieces of test result information 25 to the test manager terminal 21. The test manager terminal 21 adds up the pieces of test result information 25 received and notifies the user of the information 25.

Figure 3:
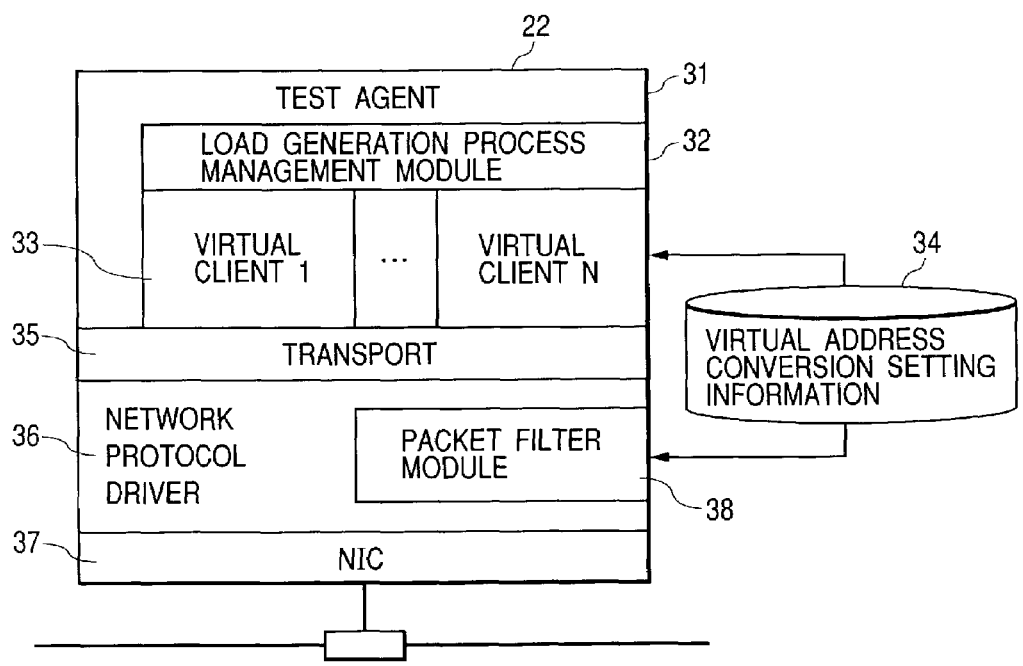
FIG. 3 is a diagram showing an example of a module architecture of a load test execution terminal.

FIG. 3 shows a module architecture of the load test execution terminal in this embodiment.

A test agent 31 performs communications with the test manager terminal 21 via the network and with low-order modules of the test execution terminal 22 such as receiving the instruction from the test manager terminal 21 and transferring it to a load generation process management module 32 or notifying the test manager terminal 21 of the information received from this module 32.

The load generation process management module 32 boots, based on virtual address conversion (translation) setting information 34 received from the test manager terminal 21 via the test agent 31, a plurality of client modules as a process of a virtual client 33, thereby generating a load access onto the test object server 24.

The load generation process management module 32 manages the status information during the operation of each virtual client 33 and, if a status change occurs and so on, notifies the test manager terminal 21 of information on this status change via the test agent 31 as the necessity may arise.

The virtual clients (1 through N) 33 may be defined as a group of threads (program modules) or a group of processes generated and managed by use of the client module for testing.

The virtual address conversion setting information 34 is defined as mapping information that maps the virtual client to a virtual network address, wherein the information 34 specifies which virtual network address is used for the virtual client 33 to access the load test object server 24. A packet filtering module 38, which will be explained later on, executes a process of rewriting a piece of address information contained in a transmission/reception packet by utilizing the virtual address conversion setting information 34.

A network transport module 35 is a module for providing a variety of network services to high-order modules.

A network protocol driver 36 provides a protocol-level service to the high-order transport module 35. On the other hand, the network protocol driver 36 has a function of controlling a low-order NIC (Network Interface Card) 37 in response to a request from the host.

The NIC 37 is the network interface card connected to the network.

A packet filtering module 38 is incorporated into an intermediate layer of the network protocol driver 36, and executes a filtering process of the network packets transferred and received between the transport module 35 and the low-order NIC 37. This filtering process is executed based on the virtual address conversion setting information 34, wherein (header information of) the packet that meets the conditions is rewritten with a specified item of information and thus transferred to the high- or low-order module.

FIG. 4 shows an example of a structure of packet filtering setting information in the first embodiment.

The packet filtering setting information may exist as either a setting file or a setting key for registry etc. In any case, the packet filtering setting information is read when booting the packet filtering module 38, or read based on a setting update notification given from the high-order module, and the packet filtering module 38 executes the packet filtering process according to this setting.

Identification information specifying a version of the packet filtering setting information and identifying the packet filtering setting information, is set in a data identification information (field) 401.

The number of the virtual clients recorded in the present setting information is set in a virtual client count 402. Namely, the packet filtering module 38 is capable of executing the network address information translating processes in response to operations of the client modules the number of which corresponds to the number set in this virtual client count 402. The data identification information 401 and the virtual client count 402 form management information.

An operation flag 403 indicates an operation to the packet filtering module 38. The packet filtering module 38, if the flag 403 is set ON, executes the packet filtering process in a way that reflects this setting information. Whereas if the flag 403 is set OFF, the packet filtering module 38 stops executing the filtering process irrespective of this setting.

Pieces of setting information 404 through 413 are defined as setting information set on a virtual client basis. In this example of the data structure, one virtual address is mapped to one virtual client, however, conditions and information, contained in the network packet, for mapping to the virtual address are pieces of conversion setting information 407 through 412. One item of virtual client setting information contains one piece of virtual address information and plural pieces of conversion setting information needed for a conversion into the virtual address.

Protocol identification information as an object of the present packet filtering process, is set in protocol identification information 404.

Virtual network address information 405 specifies a virtual network address mapped to the virtual client concerned. The packet filtering module 38 sets this virtual network address in the network packet transmitted from the process of the virtual client module concerned. Further, the network packet addressed to this virtual address is transferred to a process of the virtual client module in which the same virtual address is set.

The number of pieces of conversion setting information that will hereinafter be described in detail, is set in a conversion setting information count 406.

Pieces of setting information 407 through 409 are intra-packet setting information transferred and received between the respective virtual clients and the packet filtering module 38. Pieces of setting information 410 through 412 are intra-packet setting information transferred and received between the packet filtering module 38 and the NIC 37. Hence, the setting information 407 through 409 is defined as network data of the application software and therefore called (logical network information), while the setting information 410 through 412 is defined as data on lower layers than the driver or data going out over the network (much closer to the driver) and therefore called (physical network information).

A local port 407 is a piece of information on a local port used by the virtual client.

A remote address 408 is a piece of network address information of a remote destination terminal to which the virtual client is to be connected. Normally in the present testing system, a network address of a test object server terminal 24 is set in this remote address 408.

A remote port 409 is a piece of network port information for a process on the remote destination terminal to which the virtual client is to be connected. Normally in the present testing system, a piece of network port information queued up for being accepted by a server process of the test object server terminal 24, is set in this remote port 409.

A local port 410 is a piece of information on a local port set in the network packet actually forwarded and received.

A remote address 411 is network address information, set in the network packet actually forwarded and received, of the remote destination terminal as the other communication party.

A remote port 412 is network port information, set in the network packet actually forwarded and received, for the process on the remote destination terminal as the other communication party.

Information 413 indicates that there exist the pieces of conversion setting information 407 through 412 the number of which is set in the conversion setting information count 406.

FIG. 5 is a diagram showing one example of a relationship between an application processing packet and the transmission/reception packet on the network.

Referring to FIG. 5, an application processing packet 51 is a data set as a process object by each virtual client. The application processing packet 51 contains:

Substantial (actual) local host address information,
Network port information (logical local address) to which the virtual client process is linked, and
Remote address information (logical remote address) to which the virtual client process is linked.

These pieces of information are set in the transmission data by the virtual client and are, in the reception data, the data into which the packet filter 52 translates the data of the reception packet 53 on the network on the basis of the packet filtering setting information explained in FIG. 4.

Either the transmission or reception packet data may be, as described above, defined as the data of which the application is aware, and hence the network information contained in the packet is called the (logical network information) as defined above.

On the other hand, the transmission/reception packet 53 on the network is the packet data on the network that are transmitted from the present host terminal to other remote terminal, or the network packet data transmitted from other remote terminal and received by the present host terminal. The packet 53 contains:

Virtual local host address,
Network port information (physical local port) specified for connecting the remote terminal to the virtual client concerned,
Address information (physical remote address) of the remote terminal actually existing on the network, and
Port information (physical remote port) of the remote terminal actually existing on the network.

These pieces of information are, in the transmission data, set by the packet filter 52 and are, in the reception data, set by the test object server processing process running on the connection destination remote terminal on the network.

Figure 6:
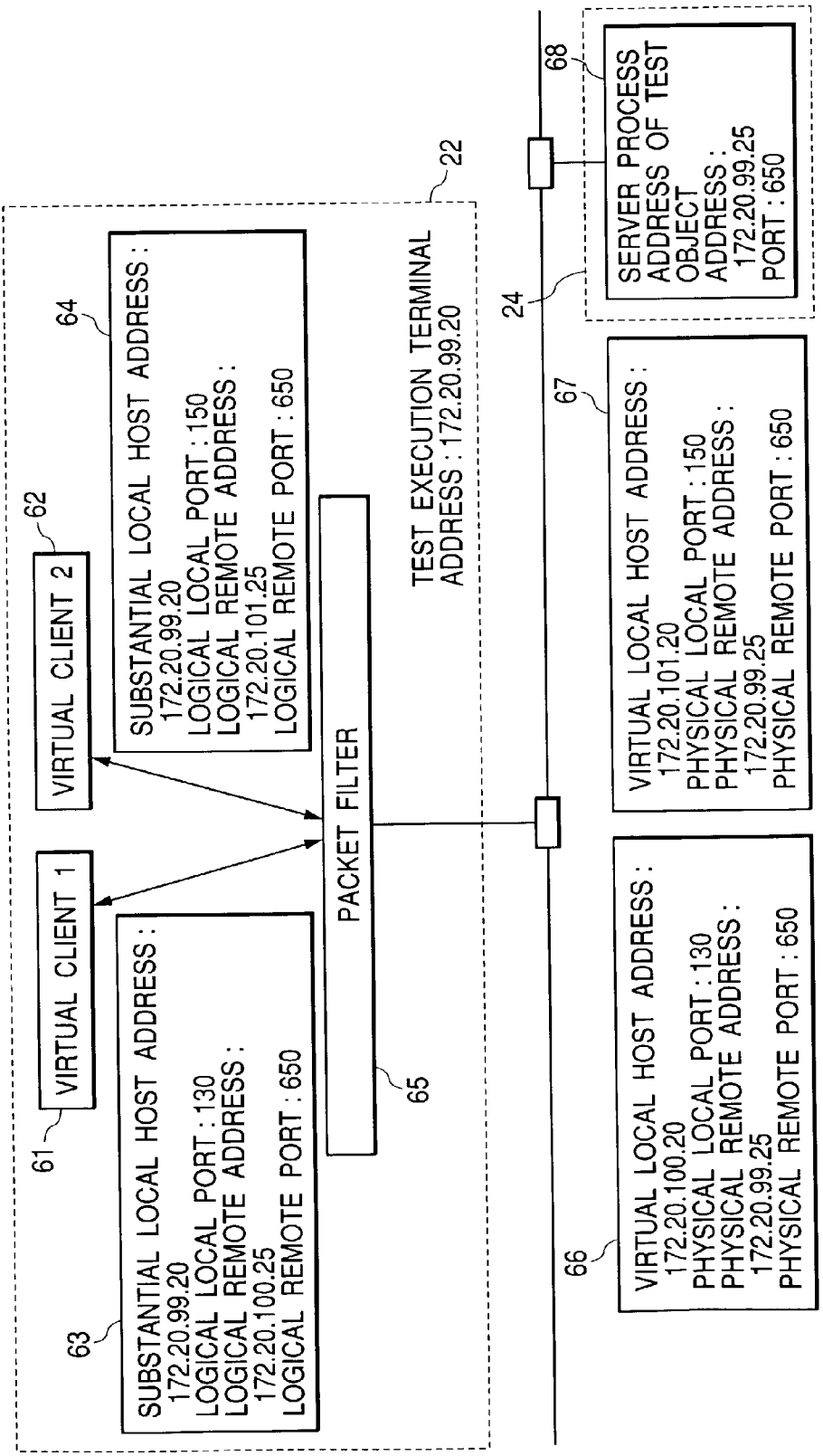
FIG. 6 is a diagram showing a relationship between each virtual client and a virtual address.

FIG. 6 is diagram showing one example of a relationship between each virtual client and the virtual address.

Processes 61, 62 are processes of the virtual clients 1, 2. These processes 61, 62 are generated threads or processes different from each other by use of the client module for testing.

These virtual clients process application processing packets 63, 64 corresponding thereto respectively.

In the transmission process to the remote terminal, a packet filtering module 65 converts, based on the packet filtering setting information described above, the application processing packet 63 into a transmission packet 66 on the network. Similarly, the packet filtering module 65 converts the application processing packet 64 into a transmission packet 67 on the network.

By contrast, in the reception process from the remote terminal, the packet filtering module 65 converts, based on the packet filtering setting information shown in FIG. 4, the reception packet 66 on the network into the application processing packet 63. Similarly, the packet filtering module 65 converts the reception packet 67 on the network into the application processing packet 64 on the network.

In the example shown in FIG. 6, the physical remote address and the physical remote port in the transmission/reception packet on the network take the same values as those set in the network information of the test object server process 68 on the remote terminal, and therefore transferred intact to the test object server process.

In the example in FIG. 6, the pieces of packet filtering setting information shown in FIG. 4 are set as follows:

(Virtual Client 1)
Virtual network address information 405=172.20.100.20
Logical remote address information 408=172.20.100.25
Physical remote address information 411=172.20.19.25

(Virtual Client 2)
Virtual network address information 405=172.20.101.20
Logical remote address information 408=172.20.101.25
Physical remote address information 411=172.20.99.25

Referring again to FIG. 6, the setting information other than the above is set unconverted.

Figure 7:
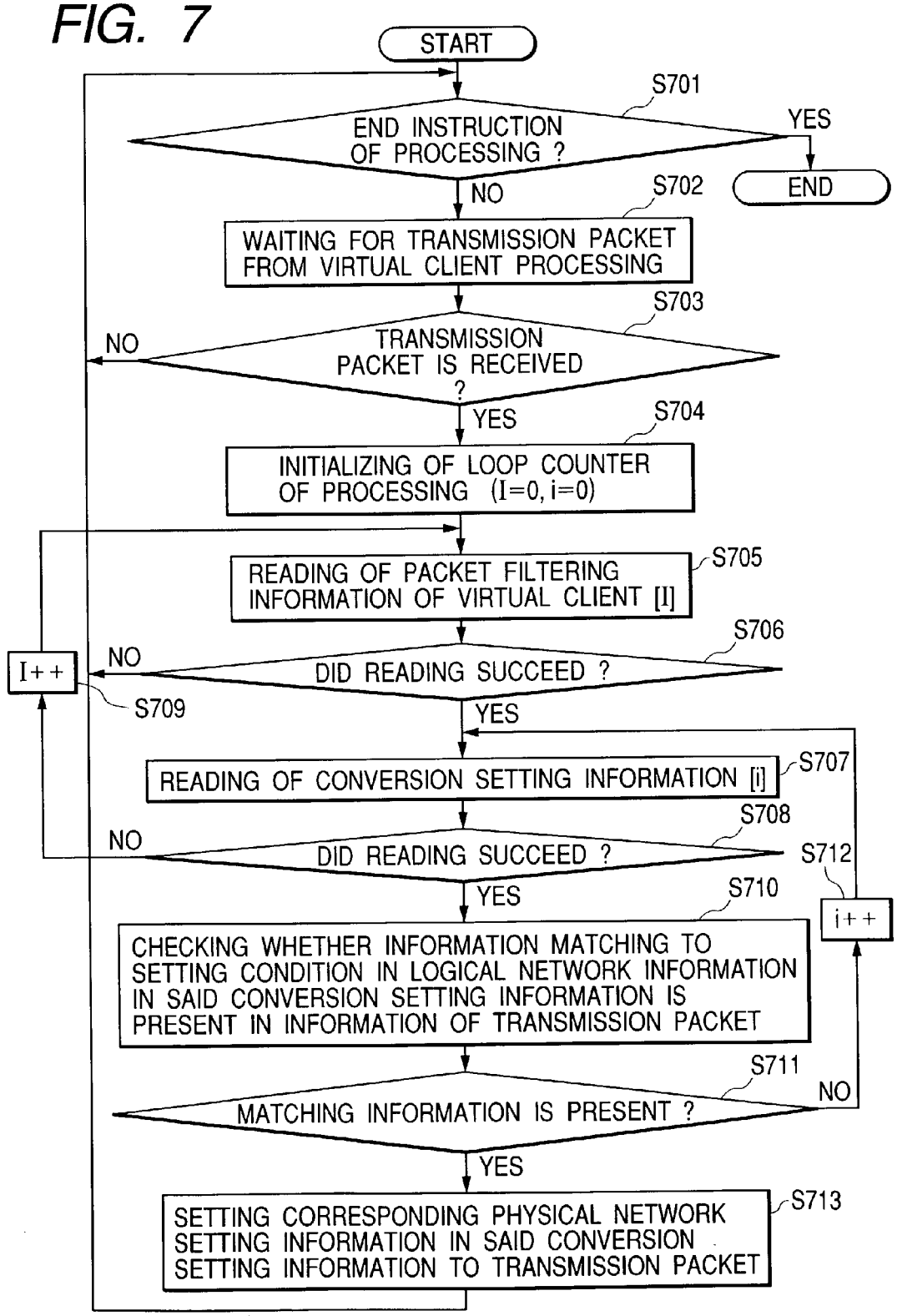
FIG. 7 is a flowchart showing an example of conversion processing steps of a transmission request packet from the virtual client.

FIG. 7 is a flowchart showing an example of conversion processing steps of a transmission request packet from the virtual client in the packet filtering module 52 in the first embodiment.

The present packet filtering module 52 is in a standby-for-event status and, upon receiving some category of event, executes the process that follows.

To start with, in step S701, the packet filtering module 52 judges whether the high-order module gives a termination instruction of the packet filtering process. In the case of judging that the termination instruction is given, the module 52 diverts to a termination process and, whereas if judging that the termination instruction is not given, advances to step S702.

In step S702, the module 52 waits for the transmission packet from the virtual client process. Then, in step S703, the module 52 judges there is a transmission packet and, when judging that there is the transmission packet, advances to a process in step S704, wherein the module 52 executes a conversion process of this transmission packet. Whereas if it is judged that no transmission packet exists, the module 52 again comes back to the initial standby-for-event status.

From step S704 onwards, the module 52 executes the conversion process of the transmission packet and therefore carries out a process of reading pieces of information concerned from the packet filtering setting information as shown in FIG. 4.

At first, in step S704, the module 52 initializes a process loop counter for performing the processes described above. In this process loop, "I" represents a counter for indicating a virtual client count, and "i" represents a counter for indicating individual conversion setting information count set for every virtual client.

In step S705, the packet filtering information of a virtual client (I) is read out.

In step S706, it is checked whether the reading process gets successful in step S705. If successful, the processing proceeds to step S707. Whereas if unsuccessful, an implication is that there exists no setting information of the virtual client concerned, the module 52 does not execute the packet filtering process and again reverts to the initial standby-for-event status.

In step S707, the module 52 reads an i-th item of conversion setting information from the virtual client information read out in step S705.

In step S708, the module 52 checks whether the reading process is successful in step S707. If successful, the module 52 advances to step S710. Whereas if unsuccessful, the module 52 judges that all the setting information of the virtual client concerned is read out, and diverts to step S709.

In step S709, the loop counter "I" is incremented, and the processing moves back to step S705.

In step S710, the module 52 checks whether the transmission packets includes a packet that meets the setting conditions of the logical network information contained in the readout conversion setting information.

In step S711, if it is judged as a result of the check that there exists the packet meeting the setting conditions, the module 52 advances to step S713 in order to execute the conversion process. Whereas if not, the processing diverts to step S712.

In step S712, the loop counter "i" is incremented for reading a next item of conversion setting information, and the processing loops back to step S707.

In step S713, the relevant logical information contained in the transmission packet data is converted into physical information mapping thereto on the basis of the conversion setting information detected, and set therein.

After an end of this process, the module again returns to the initial standby-for-event status.

FIG. 7 illustrates the processing by the packet filtering module with respect to the transmission request packet forwarded from the virtual client, however, the processing by the packet filtering module with respect to the reception packet on the network is substantially the same.

A different point is that the module 52 "checks in Step S710 whether there exists the packet meeting the setting conditions contained in the physical network information" instead of "checking whether there exists the packet meeting the setting conditions contained in the logical network information", and may execute a process of "the logical network setting information in the reception packet" instead of "setting the physical network setting information in the transmission packet" in the process in step S713.

Figure 8:
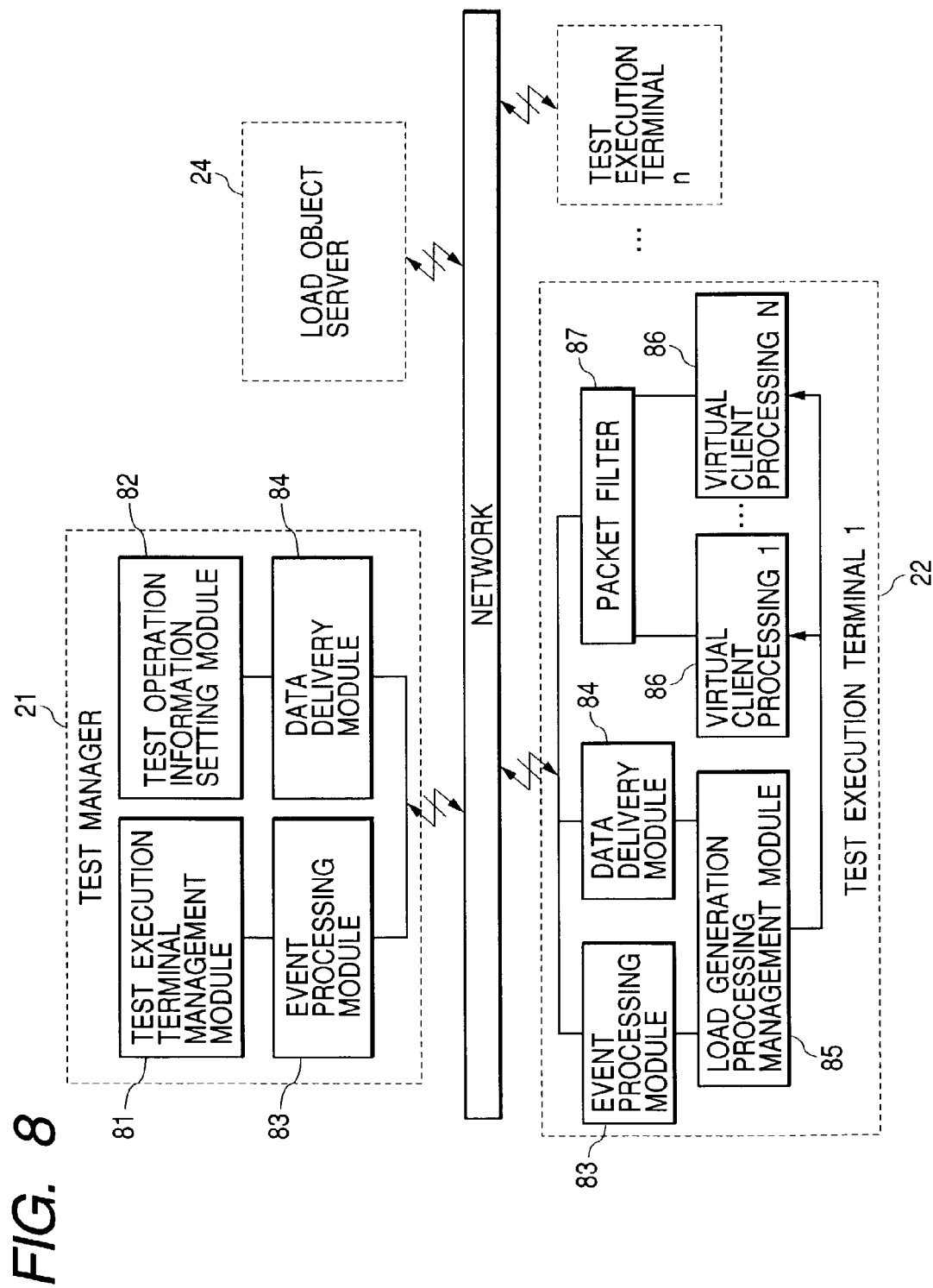
FIG. 8 is a diagram showing one example of a module architecture of the load test system.

FIG. 8 is a diagram showing one example of a module architecture of the load testing system according to the first embodiment.

FIG. 8 illustrates an example in which the load testing system constructed of one test manager terminal 21 and n-pieces of test execution terminals 22, performs a load test on one test object network server. According to the present invention, however, the load tests can be implemented on a plurality of test object servers without sticking to this restriction.

Functions of the test manager terminal 21 are provided by modules 81 through 84 that will be hereinafter described.

A test execution terminal management module 81 confirms an execution state of the test conducted by each test execution terminal 21. This module 81 acquires a piece of status change event information from the test execution terminal 21 by utilizing an event processing module 83. Alternatively, an instruction of starting or stopping the execution of the test can be made by issuing an event to a desired test execution terminal.

A test operation information setting module 82 sets an operation of the test actually conducted by each test execution terminal. Simultaneously, the test data used by the test-oriented client module executed for generating the load on each load test execution terminal 21 and by the client modules described above, are specified by use of this test operation information setting module 82. Proper items of data in the data set herein are distributed to the respective test execution terminals by utilizing a data distribution module 84.

An event processing module 83 is a module for issuing an event onto the network, and acquiring event information on the network and analyzing a content thereof. The event processing modules 83 exist on both of the test manager terminal 21 and the test execution terminal 22. The even processing module 83 is used, on the test manager terminal 21, for giving an instruction of process to each test execution terminal and is used, on the test execution terminal 22, for notifying of a change in test execution status of the module 83 itself.

A data distribution module 84 is a module for distributing an indicated item of data to a desired terminal on the network. The data distribution modules 84 exist on both of the test manager terminal 21 and the test execution terminal 22. The data distribution module 84 is used, on the test manager terminal 21, for distributing the test-related data to each test execution terminal and is used, on the test execution terminal 22, for transmitting test result information to the test manager terminal 21.

Next, an architecture of the functions of the test execution terminal 22 will be explained.

A load generation processing management module 85, based on the test operation information received from the data distribution module 84, boots the client module and generates a load access onto the test object server 24 by utilizing the test data distributed thereto.

Herein, the load generation process is actualized by starting up the client module distributed from the test manager 21 under conditions indicated. A plurality of client modules (N-pieces of client modules in the example shown in FIG. 8) can be booted simultaneously, and further a plurality of different client modules can be simultaneously booted on the single test execution terminal.

The test manager terminal 21 is notified of operation states of the individual client modules by using the event processing module 83.

Virtual client processes (1 through N) 86 are defined as a group of threads or processes generated and managed by the load generation processing management module 85, and generate the load access onto the test object server 24 in accordance with the test operation information indicated by the test manager.

A packet filter 87 executes a network control process in the load test such as mapping a plurality of network addresses to a plurality of load generation processes in a pseudo manner, and so on.

Through the processes described above, the plurality of client modules are made to run simultaneously on the single load test execution terminal, the respectively unique virtual network addresses are set, and the packet filter rewrites the network address information contained in the packet, whereby the performance test of the access load from the multiplicity of client terminals can be implemented on the small number of test execution terminals.

Second Embodiment

A scheme in a second embodiment is that the network setting information before implementing the test is backed up, and, after finishing the test, the setting of the network before implementing the test is restored by the backed-up setting information.

FIG. 9 shows one example of the network setting information for testing, to which the original network setting information and the virtual network address setting information are added.

Network setting information 91 before executing the load test contains pairs of network names of the respective terminals and network addresses that are IP addresses in this example.

The virtual addresses are not set in the original network setting information because of executing no load test.

Namely, the following is three pieces of terminals of which a name resolution must be done on the network:

Test object server terminal TestSrv,

Local terminal (self-terminal) Client0 for executing the test, and

Local terminal (other terminal) Client1 for executing the test.

On the other hand, network setting information 92 when executing the load test contains network addresses of the virtual clients set on the self-terminal and network names thereof. These network addresses and network names can be acquired on the respective test execution terminals when implementing the test on the basis of the virtual network address information 405 set in the packet filtering setting information shown in FIG. 4.

In this example, the network information of the virtual client set on the local terminal (self-terminal) Client0 for executing the test is as shown in Table 1.

TABLE 1

| Virtual Network Name | Virtual Address |
| --- | --- |
| Client0-VC0 | 172.20.104.10 |
| Client0-VC1 | 172.20.104.11 |
| Client0-VC2 | 172.20.104.12 |
| Cllent0-VC3 | 172.20.104.13 |

Similarly, the network information of the virtual client on other test execution terminal is as shown in Table 2.

TABLE 2

| Virtual Network Name | Virtual Address |
| --- | --- |
| Client0-VC0 | 172.20.105.10 |
| Client0-VC1 | 172.20.105.11 |

Further, Table 3 shows the network information set as logical remote address information (the remote address 408 in FIG. 4) for the test object server 24, used for each virtual client process on the self-terminal to do accessing.

TABLE 3

| Virtual Network Name | Virtual Address |
| --- | --- |
| TestSrv-VC0 | 172.20.106.10 |
| TestSrv-VC1 | 172.20.106.11 |
| TestSrv-VC2 | 172.20.106.12 |
| TestSrv-VC3 | 172.20.106.13 |

The above virtual address information contained in the network setting information 92 for the load test is significant only during the execution of the load test instructed but is meaningless setting (or improper network setting) when executing a load test with different settings or when the load test is not carried out.

Hence, according to the load testing system in the second embodiment, the process before executing the load test is that the setting information 91 is backed up, the network setting information 92 for the load test is thereafter set, and the original network setting information 91 is again restored after finishing the load test.

Figure 10:
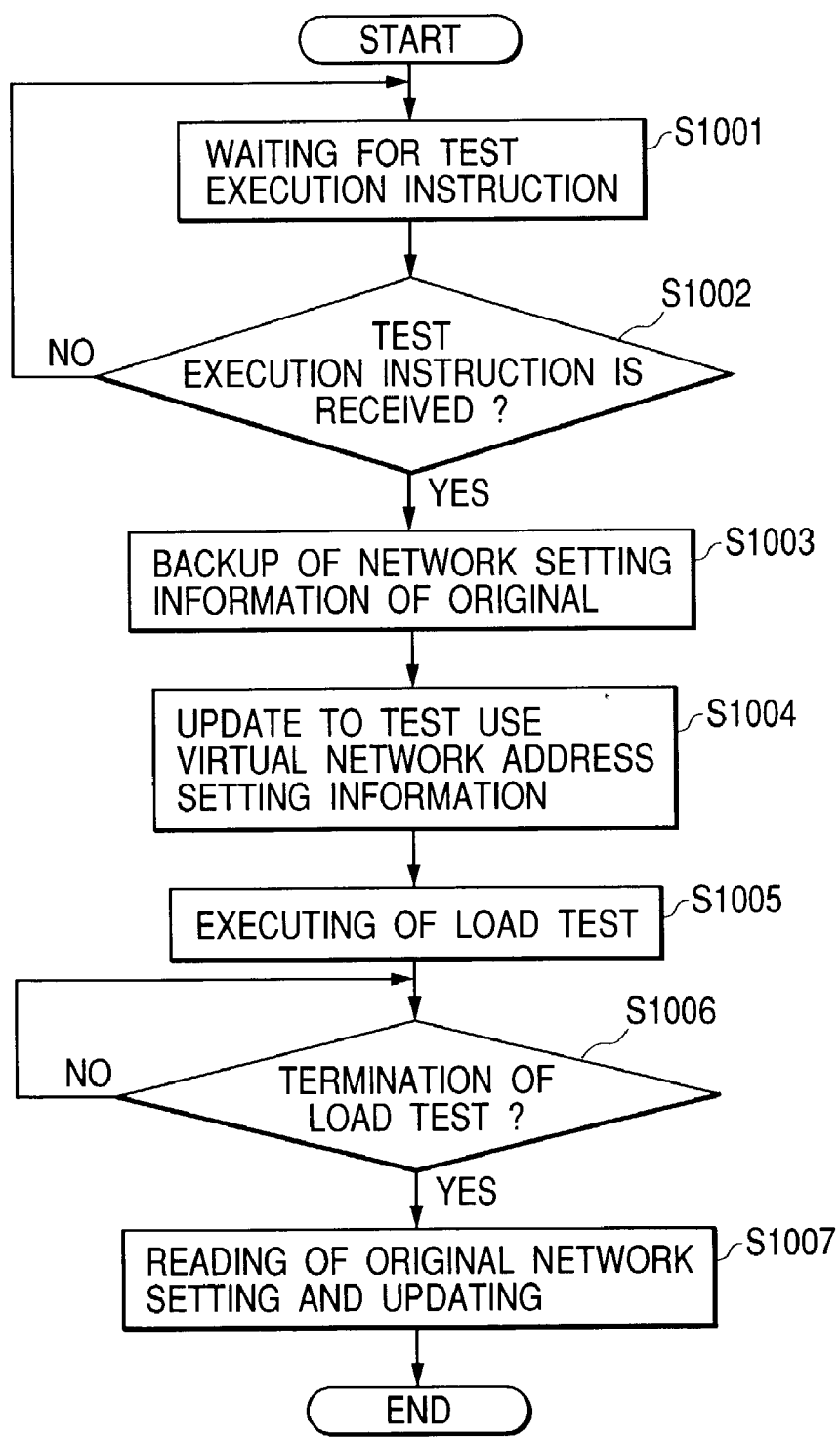
FIG. 10 is a flowchart showing an example of network setting backup processing steps.

FIG. 10 is a flowchart showing an example of network setting backup processing steps in the second embodiment.

The filtering module is in the standby-for-event status and, upon receiving some category of event, executes the process that follows.

To start with, in step S1001, the packet filtering module waits for a test execution instruction given from the high-order module.

Herein, when judging in step S1002 that the test execution instruction is given, the filtering module advances to step S1003. Whereas if not, the filtering module goes back again to the initial standby-for-event status.

In step S1003, the filtering module executes a process of backing up the present network setting information before executing the load test.

Next in step S1004, the filtering module executes a process of setting the test-oriented virtual network address information that is instructed from the test manager.

In this state, the preparations for executing the load test are completed, and hence in step S1005 the actual load test is performed.

In step S1006, the filtering module checks an end of the load test. In the case of judging that the load test is not yet terminated, the filtering module returns to the start of this step and checks a state of the execution of the test. If judging that the test is terminated, the filtering module advances to step S1007, wherein the original network setting information backed up in step S1003 is read out and reset.

Through the processes executed so far, there is eliminated a necessity for complicated operations for resetting the addresses after setting the virtual addresses.

Third Embodiment

The discussion in a third embodiment will be focused on contents of the test operation information distributed to the test execution terminal 22 from the test manager terminal 21 and on a test execution method involving the use of the test operation information. FIG. 11 shows an example of a data structure of the test operation information in the third embodiment.

Data identification information 1101 contains a data identification ID for showing that the data concerned are identified with the test operation information data of the preset load testing system, and a piece of version management information of the present information.

Test manager terminal information 1102 contains pieces of identification information on the network such as a network address etc of the test manager terminal 21 having created the present setting information.

A test execution terminal count 1103 contains the number of the test execution terminals 22 managed as by the present setting information. There are exist the same number of subsequent test terminal setting information sets as this test execution terminal count 1103.

These pieces of information 1101 through 1103 are defined as management information of the present test operation information as a whole.

Test execution terminal information 1104 contains pieces of identification information on the network such as a network address etc of the terminal 22 for executing the test in accordance with the subsequent setting information.

A load generating process count 1105 contains the number of client processes (threads or processes) for generating the load, the client process being generated on the present test execution terminal 22. There exist the same number of subsequent (load process setting) information sets as this load generating process count 1105.

Process simultaneous execution information 1106 contains the number of processes generated simultaneously and a generation interval thereof in a case where a plurality of load processes are generated on the present execution terminal 22.

Timeout information 1107 contains a threshold value from which a timeout of each process on the present terminal is judged.

Pieces of information 1104 through 1107 are defined as management information on all the processes on the test execution terminal 22.

A client module name 1108 is a name of the client module used for generating the load process concerned. This client module is distributed to each test execution terminal 22 from the test manager terminal 21 (or if dual checks are carried out, and in the case of the module initially existing on the test execution terminal 22, a futile distribution process is not executed).

A test data file name 1109 is data used for the client module 1108 to access the test object server 24 in the load process.

Client module operation setting information 1101 contains a list of functions executed for the client module given a "name 1108" to perform the load test, and information for synchronizing a process timing.

These functions may be defined as modules used for the client module given, e.g., the "name 1108" to execute a series of printing processes. These functions are listed as follows:
1. Printer initializing function,
2. Function of listing the printers,
3. Function of registering a job in the printer,
4. Function of listing statuses of the printer indicated.

In the case of having these functions, a piece of information for specifying, for instance, the functions 1, 2 and 3 as a list of the functions executed in the present load process, is set in the information 1110.

The process timing synchronizing information is, if a plurality of load processes are executed on, e.g., one test execution terminal, defined as setting information for synchronizing a start point of the process of the function 2 even when the process of the function 1 is terminated inconsistently between the respective load processes in the case of executing the processes of, for instance, the functions 1, 2 3.

Virtual network address information 1111 is information for actualizing a function of making the processing appear as if the individual network terminal accesses the load test object server 24 for every load process when the plurality of load processes are executed on the single test execution terminal 22. This function can be actualized by giving the virtual network address information 1111 to the packet filter 87 described above.

Load test object server information 1112 contains a piece of identification information on the network such as a network address etc of the test object server 24 accessed by the preset load process.

Other control information 1113 contains detailed setting information needed for executing the present load process.

Pieces of information 1108 through 1113 are defined setting information for every load process.

Figure 12:
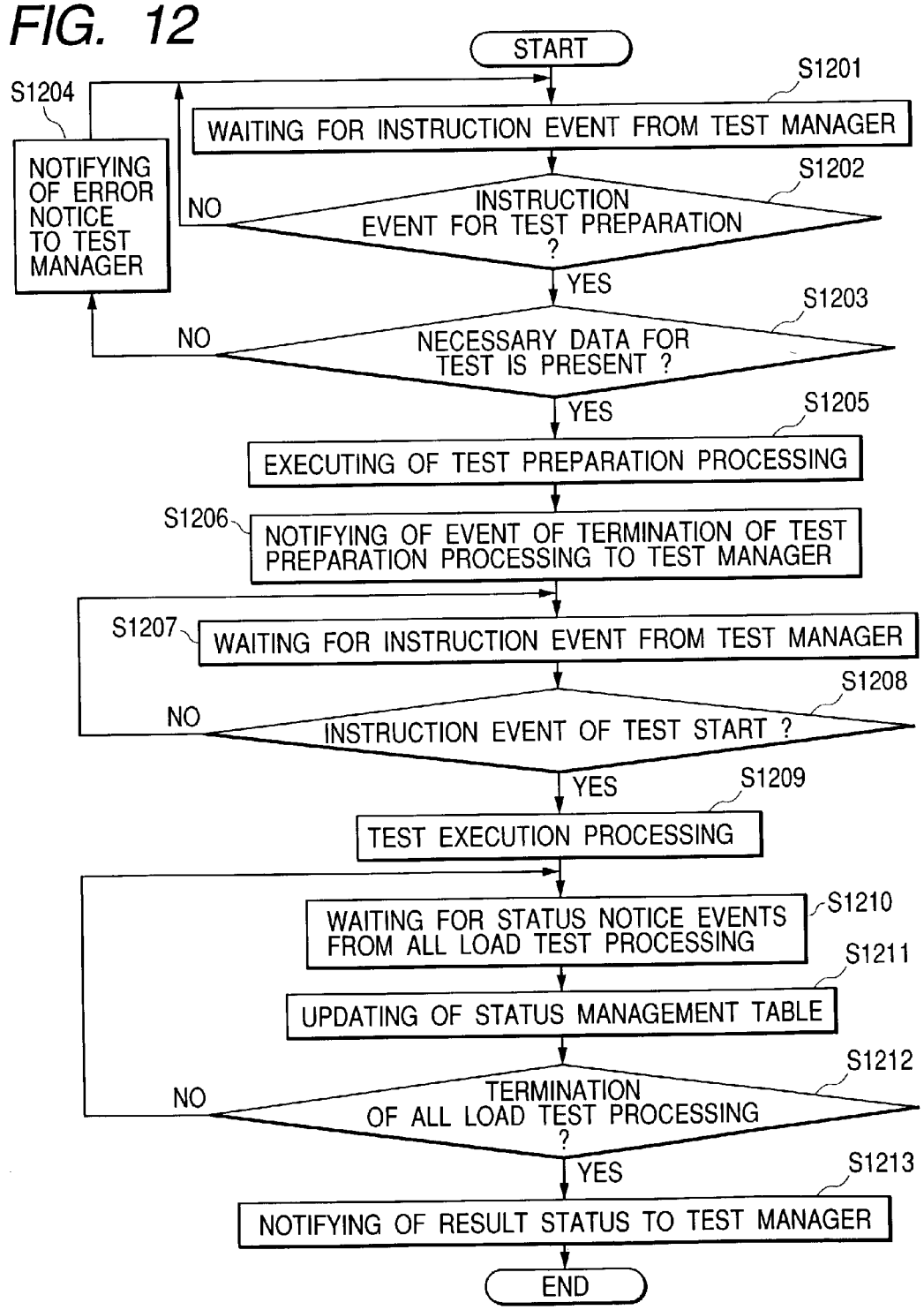
FIG. 12 is a flowchart showing an example of load test execution processing steps on the test execution terminal.

FIG. 12 is a flowchart showing an example of load test execution processing steps on the test execution terminal 22 in the third embodiment.

This flowchart is, for simplifying the explanation, based on a premise that the test manager 21, in advance of processing in this flowchart, has already completed setting with respect to the client module for testing and the test data and also a distribution process thereof.

At first, in step S1201, an instruction event from the test manager is waited. It is checked in step S1202 whether the event is an instruction event for test preparations. If judging that the event is a test start instruction, the processing moves to step S1203. Whereas if not, the processing loops back to step S1201.

In step S1203, it is checked whether the data (the test setting information, the client module for testing and the test data) necessary for executing the test exist on the self-terminal (the test execution terminal 22). If judging that the same data exist thereon, the processing goes to step S1205. Whereas if not, the processing diverts to step S1204.

In step S1204, no such data existing on the self-terminal, the test manager 21 is notified of error information saying that the instructed test is unable to be executed.

In step S1205, the load process is started up based on the indicated setting by use of the distributed-to-the-self-terminal data needed for testing, and a test preparation process is thus executed.

In step S1206, a test preparation completion event is issued, and the test manager 21 is notified of this event.

In step S1207, the processing comes again to the process of waiting for the instruction event from test manager 21.

In step S1208, if the event is judged to be a test start instruction event from the test manager 21, the processing advances to step S1209. Whereas if not, the standby-for-event process is again executed in step S1207.

In step S1209, the execution instruction is given to all the load test processes, and a process of generating the load on the test object server 24, is executed.

In step S1210, there is carried out a process of monitoring a status notification event from all the load test processes.

In step S1211, a process of updating the information in a status management table on the test execution terminal 22 is triggered by a status change notification event from the load test process. This status management table serves to manage termination statuses (normal/error) of all the load test processes, wherein it is judged that the test is on the execution until all the load test processes are terminated, and the status monitoring process continues.

In step S1212, it is judged by checking the contents in the status management table whether all the load test processes are terminated. If all the load test processes are judged to be terminated, the processing moves to step S1213. Whereas if not, the processing returns to step S1210, wherein the status notification event waiting process from the load test process continues.

In step S1213, all the load test processes being terminated, as a result, the test manager 21 is notified of the status, and the processing comes to an end.

With those processes thus executed, a variety of client access patterns are actualized by interchanging the test data with the client modules without any restrictions for the various server systems on the network, whereby a highly-efficient inspection of the whole system including the network can be attained.

MODIFIED EXAMPLE 1

A modified example of the embodiment discussed above will hereinafter be described. According to the embodiment discussed above, during the execution of the process for the load test, relieving (a load of) the data communications between the test manager 21 and each test execution terminal 22, involves providing each of the test execution terminals 22 with the load generation processing management module 85, thus managing the status notification event given from each load generation process during the execution of the test, and notifying the test manager of only the necessary notification information as an event.

If a sufficient bandwidth is ensured on the network and if the test manager terminal 21 has a sufficient processing capacity, referring again to FIG. 8, what can be schemed is:

The load generation processing management module 85 executes only the initializing/terminating process of each virtual client process 86, and Each virtual client process 86 directly notifies of the status the test execution terminal management module 81 on the test manager 21 by directly utilizing the event process module 83.

In this modified example, the test manager 21 can acquire the status of each virtual client process 86 in detail in actual time, which is executed on each test execution terminal 22.

MODIFIED EXAMPLE 2

The scheme in the embodiment discussed above was that the data (the test setting information, the client module for testing and the test data) needed for each test execution terminal 22 to perform the load test, are distributed to each of the test execution terminals 22 from the test manager 21.

For relieving the load of the test manager 21, however, each test execution terminal 22 may acquire the data required for the load test in the following steps.

Step 1: A preparation of the data needed for the test is completed in the test manager 21.

Step 2: The test manager 21 notifies each test execution terminal 22 of an event for indication of the acquisition of the data required for the test.

Step 3: Each test execution terminal 22 requests the test manager 21 for the test data required by the terminal 22 itself and downloads the same test data.

Step 4: The test execution terminal 22, upon finishing downloading the necessary data, makes test execution preparations, and notifies the test manager 21 of a result thereof by issuing an event showing this result.

Step 5: The test manager 21, after confirming that the events, issued by all the test execution terminals 22, each showing the completion of the test execution preparation have reached, issues an instruction event of the test execution to all the test execution terminals 22.

Note that the present invention may be attained by supplying an apparatus or a system with a storage medium stored with software program codes for actualizing the functions in the embodiments discussed above, and making a computer in the apparatus or the system read and execute the program codes stored on the storage medium.

Further, the present invention may include a case where the computer in the apparatus or the system reads and executes the program codes stored on the storage medium, and the functions in the embodiments discussed above are thereby directly actualized, and also a case where the functions described above are actualized by processes of OS (Operating System) etc running on the computer on the basis of instructions by the program codes.

In these cases, it follows that the program containing these program codes configures the present invention.

According to the embodiments discussed so far, the plurality of client processes are simultaneously operated on the single load test execution apparatus, the respectively unique virtual network addresses are set, and the source network address information contained in the packet is rewritten into the virtual network addresses set by the client module from the actual network addresses when accessing the server in each of the client processes. Further, if the destination network address contained in the network packet received from the server is categorized as the virtual network address managed in the apparatus, this virtual network address is rewritten into the actual network address, and this packet is thereby transferred to the client process with this virtual network address set therein. Therefore, the performance test of the access load from the multiplicity of client terminals can be implemented on the small number of test execution terminals without depending on the network protocols used.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A load test execution apparatus for testing a load of accesses from clients to a server on a network, comprising:
   a client process managing unit that simultaneously operates a plurality of client processes for accessing said server, the plurality of client processes being run on said load test execution apparatus;
   a virtual network address assigning unit that assigns respectively-unique virtual network addresses to the plurality of client processes running on said load test execution apparatus;
   a transmission packet rewriting unit that rewrites a source address contained in a transmission packet for accessing said server by each of said client processes, from a physical network address of said load test execution apparatus which is common to the plurality of client processes into a respectively-unique virtual network address assigned to said client process; and
   a reception packet rewriting unit that rewrites a destination network address contained in a reception packet received from said server, from a respectively-unique virtual network address into the physical network address of said load test execution apparatus which is common to the plurality of client processes, and transfers the rewritten reception packet to the client process to which the respectively-unique virtual network address contained in the original reception packet is assigned.

2. A load test execution apparatus according to claim 1, wherein said transmission packet rewriting unit and said reception packet rewriting unit execute rewriting at a network driver level.

3. A load test execution apparatus according to claim 1, wherein said transmission packet rewriting unit executes rewriting on condition of the source address contained in the transmission packet.

4. A load test execution apparatus according to claim 1, further comprising:
   a network setting information backup unit that backs-up the present network setting information of said load test execution apparatus in advance of assigning the respectively-unique virtual network address by said virtual network address assigning unit; and
   a network resetting unit that restores the backed-up network setting information when terminating the load test.

5. A load test system comprising:
   a plurality of load test execution apparatuses; and
   a test manager apparatus for instructing said load test execution apparatuses to execute a load test,
   wherein each of said load test execution apparatuses comprises:
   a client process managing unit that simultaneously operates a plurality of client processes for accessing said server, the plurality of client processes being run on said load test execution apparatus;

a virtual network address assigning unit that assigns respectively-unique virtual network addresses to the plurality of client processes running on said load test execution apparatus;

a transmission packet rewriting unit that rewrites a source address contained in a transmission packet for accessing said server by each of said client processes, from a physical network address of said load test execution apparatus which is common to the plurality of client processes into a respectively-unique virtual network address assigned to said client process; and a reception packet rewriting unit that rewrites a destination network address contained in a reception packet received from said server, from a respectively-unique virtual network address into the physical network address of said load test execution apparatus which is common to the plurality of client processes, and transfers the rewritten reception packet to the client process to which the respectively-unique virtual network address contained in the original reception packet is assigned, and wherein said test manager apparatus comprises:

a virtual network address managing unit that manages a respectively-unique virtual network address assigned by said virtual network address assigning unit; and a virtual network address information distributing unit that distributes the virtual network address information managed by said virtual network address managing unit.

6. A load test system according to claim 5, wherein said test manager apparatus further comprises:

a load test operation setting unit that sets load test operation information for setting an operation of the test actually executed by the load test execution apparatuses, and specifies a plurality of client modules and test data utilized by said client modules; and a load test operation information distributing unit that distributes load test operation information, the client module specified for testing and the test data specified by said load test operation setting unit to said load test execution apparatuses, and wherein the client process managing unit of each load test execution apparatus boots said distributed client module and thus operates a client process by use of the distributed test data in accordance with the load test operation information distributed by said load test operation information distributing unit.

7. A load test system according to claim 6, wherein pieces of information on said client module for testing and the test data used by each load test execution apparatus, are respectively described in the load test operation information, and said client process managing unit of each load test execution apparatus is thereby capable of simultaneously executing the load tests using said different client modules and different pieces of test data.

8. A load test system according to claim 6, wherein said test manager apparatus includes a test function indicating unit that indicates, to said client module for testing, which function is executed as a load test.

9. A load test execution method in a load test execution apparatus for testing a load of accesses from clients to a server on a network, comprising:

a client process managing step of simultaneously operating a plurality of client processes for accessing said server, the plurality of client processes being run on said load test execution apparatus;

a virtual network address assigning step of assigning respectively-unique virtual network addresses to the plurality of client processes running on said load test execution apparatus;

a transmission packet rewriting step of rewriting a source address contained in a transmission packet for accessing said server by each of said client processes, from a physical network address of said load test execution apparatus which is common to the plurality of client processes into a respectively-unique virtual network address assigned to said client process; and a reception packet rewriting step of rewriting a destination network address contained in a reception packet received from said server, from a respectively-unique virtual network address into the physical network address of said load test execution apparatus which is common to the plurality of client processes, and transferring the rewritten reception packet to the client process to which the respectively-unique virtual network address contained in the original reception packet is assigned.

10. A computer-readable storage medium, on which is stored a computer-executable program for performing a load test execution method in a load test execution apparatus for testing a load of accesses from clients to a server on a network, comprising:

a client process managing step of simultaneously operating a plurality of client processes for accessing said server, the plurality of client processes being run on said load test execution apparatus;

a virtual network address assigning step of assigning respectively-unique virtual network addresses to the plurality of client processes running on said load test execution apparatus;

a transmission packet rewriting step of rewriting a source address contained in a transmission packet for accessing said server by each of said client processes from a physical network address of said load test execution apparatus which is common to the plurality of client processes into a respectively-unique virtual network address assigned to said client process; and a reception packet rewriting step of rewriting a destination network address contained in a reception packet received from said server, from a respectively-unique virtual network address into the physical network address of said load test execution apparatus which is common to the plurality of client processes, and transferring the rewritten reception packet to the client process to which the respectively-unique virtual network address contained in the original reception packet is assigned.

* * * * *